United States Patent Office 3,305,500
Patented Feb. 21, 1967

3,305,500
COATING COMPOSITIONS COMPRISING BUTADIENE-1,3 COPOLYMER, STARCH AND MINERAL PIGMENT
John Michael Downer, Harpenden, David Brian Wootton, Wheathampstead, and Donald Graham Hobbs, Welwyn Garden City, England, assignors to Imperial Chemical Industries Limited, London, England, a corporation of Great Britain
No Drawing. Filed July 5, 1963, Ser. No. 293,195
Claims priority, application Great Britain, July 12, 1962, 26,880/62
9 Claims. (Cl. 260—17.4)

The present invention relates to improved coating compositions for coating paper and like substrates.

The use of copolymer latices as binders for pigments in coating paper has grown considerably over the past few years. In particular copolymers of butadiene and styrene or methyl methacrylate and containing at least 30% by weight of butadiene-1,3 have been found to be very suitable for this purpose. Such copolymers are not normally used as the sole pigment binders but are generally blended in latex form with such conventional binders as casein, starch or soya protein. Difficulty arises when starch is used because, unless special precautions are taken, the starch seriously reduces the stability of the copolymer latex. This difficulty can be overcome and the latex and starch rendered compatible by preestablishing the copolymer latex by adding casein to it. However, this is a step that users of such latices prefer to avoid and it is therefore an object of this invention to provide a method of making a stable composition for coating paper or like material using as the pigment binder a styrene/butadiene or methyl methacrylate/butadiene type copolymer and starch in which pre-stabilisation with casein is unnecessary.

According to the present invention we provide a paper coating composition which comprises an intimate mixture of mineral pigment, starch and a copolymer containing from 30 to 55% by weight of butadiene-1,3 residues, from 0.1% to 13% of at least one ethylenically unsaturated mono- or dicarboxylic acid residues and at least half of the remainder either styrene or methyl methacrylate residues, or a mixture of both styrene and methyl methacrylate residues, any other constituent of the copolymer being derived from another monoethylenically unsaturated compound, said copolymer being in the form of an aqueous dispersion, there being in the composition from 8 to 50 parts by weight of starch and butadiene-1,3 copolymer together per 100 parts by weight of pigment and from 0.5 to 2 parts by weight of butadiene-1,3 copolymer to each one part by weight of starch.

Copolymers containing less than 30% by weight of butadiene residues are not film forming and therefore not suitable for use in paper coating compositions. If the content is increased to too high a value the composition may become tacky and tend to stick to the rolls during the processing of the coated paper. For this reason the copolymers of our compositions are limited to those containing not more than 55% by weight of butadiene residues. In making the copolymers faster polymerisation reactions can be carried out if the butadiene content is reduced to below 55%, leading to a cheaper product. In general the polymerisation is most economically carried out when the butadiene content does not exceed 50%. We prefer therefore to use copolymers containing not more than 50% by weight of butadiene residues.

The butadiene-1,3 copolymers are preferably copolymers made essentially from butadiene-1,3 and styrene or butadiene-1,3 and methyl methacrylate as the comonomers, together with one ethylenically unsaturated mono or dicarboxylic acid since such copolymers have extremely good pigment binding properties. However, other monoethylenically unsaturated monomers can be copolymerised with the butadiene-1,3 and styrene and/or methyl methacrylate to form pigment binders e.g. acrylonitrile, methacrylonitrile, ethyl acrylate and other lower alkyl esters of acrylic and methacrylic acids. There is little advantage to be gained by using more complicated copolymers and we prefer therefore to use as binders copolymers containing from 40 to 65% by weight of styrene and/or methyl methacrylate residues and the remainder butadiene-1,3 and the ethylenically unsaturated mono- or dicarboxylic acid because these have the required pigment binding properties and compatibility with starch.

Suitable ethylenically unsaturated mono- or dicarboxylic acids that may be used in our invention include, for example, itaconic, maleic, acrylic, methacrylic and cinnamic acids. The preferred amount of acid residues in our copolymer is from 1 to 6% by weight since this covers the most effective range for obtaining good starch compatibility. Where the copolymer is derived essentially from butadiene and styrene then we prefer to use itaconic acid as the acid ingredient of the copolymer. Where the copolymer consists essentially of butadiene and methyl methacrylate, then we prefer to use methacrylic acid as the acid ingredient of the copolymer.

These copolymers can be prepared by well known polymerisation processes and are most conveniently prepared by the emulsion polymerisation process in which the monomers to be polymerised are dispersed in an aqueous phase containing an emulsifying agent and there polymerised in the presence of a catalyst to form a stable copolymer dispersion.

In order to enable the polymerisation process to proceed easily the pH value of the emulsion should be kept below 7, preferably at pH 2 to 3, because of the presence of the acidic monomeric component. When the polymerisation has proceeded sufficiently the dispersion should be made alkaline because this ensures that the best compatibility with starch is obtained. For this the pH should preferably be increased to 8 to 9. Suitable alkalies which may be added to effect this include, for example, ammonia, sodium or potassium hydroxide, triethanolamine, and morpholine.

The ingredients to form the coating composition may be added together in any order. The pigment is normally used in the form of an aqueous dispersion containing from 30 to 70% by weight of pigment. Mineral pigments commonly used in paper coating compositions include china clay, titanium dioxide, satin white, blanc fixe and calcium carbonate. The starch may be used in any of its normally available forms.

Our invention is illustrated but in no way limited by the following examples in which all parts and percentages are expressed by weight.

EXAMPLE 1

The following materials were added to a stirred autoclave:

| | Parts |
|---|---|
| Water | 100 |
| Sodium dodecyl benzene sulphonate | 2.0 |
| Polyoxyethylated nonyl phenol | 3.0 |
| Potassium persulphate | 0.8 |
| Styrene | 57 |
| Itaconic acid | 5 |

The autoclave was purged with nitrogen, sealed and 38 parts of butadiene-1,3 were fed in.

The dispersion was maintained at 60° C. for 20 hours after which time a stable latex containing about 50% of its weight of copolymer was obtained. The pH of the latex was adjusted by the addition of ammonium hydroxide solution to raise it to 8.5.

A composition for coating paper was prepared by mixing the following materials together.

| | Parts dry weight |
|---|---|
| China clay | 100 |
| Starch | 15 |
| Copolymer latex | 15 |

The china clay was dispersed in water to give a dispersion containing 60% by weight of solids, and to this was added, with continuous agitation, the starch in the form of a hot solution containing 20% by weight of starch and prepared by dispersing the starch in water and heating to 95° C.

The required amount of the copolymer latex was added to the mixture followed by sufficient water to adjust the total solids content to 42% by weight.

This composition was then used to coat a bleached sulphite wood free base paper of Cobb size 40 by means of the air knife coating process to give a coat weight of 25 gms./sq. metre on each side. The coated paper was supercalendered. It had a high gloss, pick strength and water resistance and was suitable for printing by the offset litho process.

EXAMPLE 2

The procedure of Example 1 was followed to prepare a copolymer from the following monomers:

| | Parts |
|---|---|
| Butadiene-1,3 | 38 |
| Methyl methacrylate | 57 |
| Itaconic acid | 5 |

The other ingredients were the same as in Example 1 except that 0.3 part of potassium persulphate was used. The polymerisation was carried out at 50° C. A similar coating composition was prepared as in Example 1 using this copolymer latex and this composition was similarly used to coat a bleached sulphite wood free paper with similar results.

EXAMPLE 3

The procedure of Example 2 was followed using as the polymerisable ingredients for the copolymer:

| | Parts |
|---|---|
| Butadiene | 50 |
| Methyl methacrylate | 45 |
| Methacrylic acid | 5 |

A similar composition was prepared and applied in the same way giving similar results.

We claim:

1. A paper coating composition which comprises an intimate mixture of mineral pigment, starch and a copolymer of from 30 to 55% by weight of butadiene-1,3, from 0.1% to 13% of at least one ethylenically unsaturated carboxylic acid, and at least half of the remainder being selected from the group consisting of styrene, methylmethacrylate and mixtures thereof, any other constituent of the copolymer being derived from another monoethylenically unsaturated compound, said copolymer being in the form of an aqueous dispersion, there being in the composition from 8 to 50 parts by weight of starch and butadiene-1,3 copolymer together per 100 parts by weight of pigment and from 0.5 to 2 parts by weight of butadiene-1,3 copolymer to each one part by weight of starch.

2. A composition according to claim 1 in which said copolymer is of from 30 to 50% of butadiene.

3. A composition according to claim 1 in which said copolymer is a copolymer derived essentially from butadiene-1,3, a carboxylic acid and at least one of the group consisting of methyl methacrylate and styrene.

4. A composition according to claim 3 in which said copolymer is of from 40 to 65% of said group.

5. A composition acording to claim 1 in which said ethylenically unsaturated carboxylic acid is at least one acid selected from the group consisting of acrylic, methacrylic, maleic, itaconic and cinnamic acids.

6. A composition according to claim 5 in which said copolymer is of from 1% to 6% by weight of said acid.

7. A composition according to claim 1 in which said copolymer is derived essentially from butadiene-1,3, styrene and itaconic acid.

8. A composition according to claim 1 in which said copolymer is derived essentially from butadiene-1,3, methyl methacrylate and methacrylic acid.

9. Paper coated with a composition according to claim 1.

References Cited by the Examiner
UNITED STATES PATENTS

| 3,081,198 | 3/1963 | Miller | 260—8 |
| 3,131,158 | 4/1964 | Kemp et al. | 260—29.7 |

WILLIAM H. SHORT, *Primary Examiner.*

J. NORRIS, *Assistant Examiner.*